March 20, 1956 — G. A. KNAPP — 2,739,224
VEHICLE SIGNAL LIGHT
Filed Jan. 14, 1953 — 2 Sheets-Sheet 1

INVENTOR.
George A. Knapp
BY
Parker, Prochnow & Farmer,
Attorneys.

March 20, 1956 G. A. KNAPP 2,739,224
VEHICLE SIGNAL LIGHT
Filed Jan. 14, 1953 2 Sheets—Sheet 2

INVENTOR.
George A. Knapp,
BY
Parker, Prichmore Harnett,
Attorneys.

2,739,224

VEHICLE SIGNAL LIGHT

George A. Knapp, De Witt, N. Y., assignor to R. E. Dietz Company, Syracuse, N. Y.

Application January 14, 1953, Serial No. 331,287

7 Claims. (Cl. 240—8.22)

This invention relates to signal units or lights such for example as may be used on motor vehicles for indicating that a turn of the vehicle in either direction is contemplated.

One of the objects of this invention is to provide a signal light of improved and simplified construction in which the housing and lens supporting parts are permanently mounted on a base, thus providing a complete assembly for holding a lens and gasket. A further object is to provide a signal light of this type with a split flexible housing permanently secured to a base at a portion thereof adjacent to the split and having the other end releasably clamped to the base to contract the housing about a lens, and to permit the housing when not clamped to be expanded to release the lens. A further object is to provide a light of this kind which is so constructed that a single screw or fastening device secures all parts of the signal light together, so that when a light bulb is to be renewed or a lens replaced, only one screw need be actuated to permit access to the interior of the housing. It is also an object of this invention to provide a housing of this type constructed to securely press a lens toward a gasket to form a weather-tight seal. A further object is to provide a signal light with a bolt for securing the same to a part of a vehicle, which bolt also serves to connect parts of the signal light to each other.

Other objects and advantages will be apparent from the following description of one embodiment of the invention and the novel features will be particularly pointed out hereinafter in connection with the appended claims.

Figure 4:
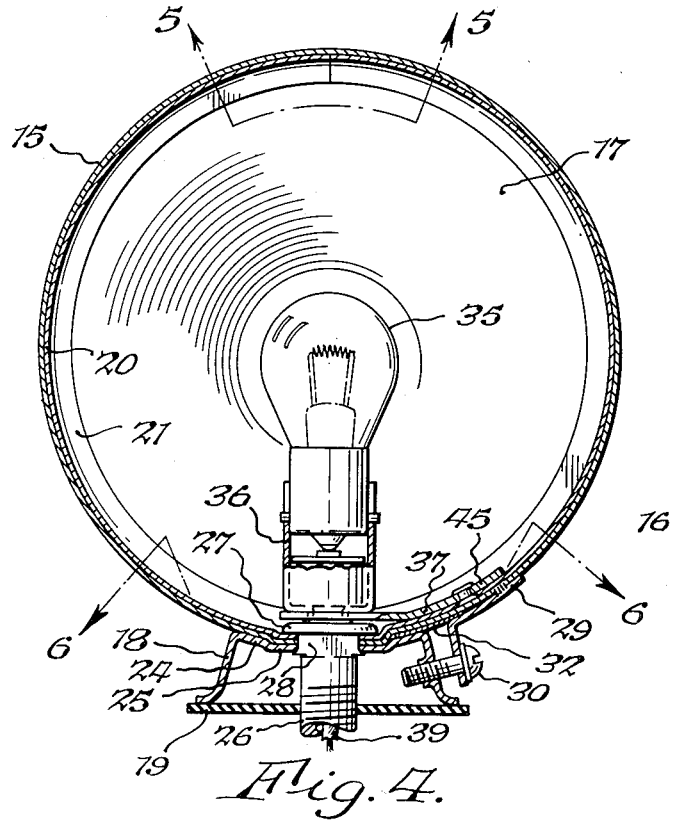
Fig. 4 is a central sectional elevation thereof, on line 4—4, Fig. 3.
Figure 5:
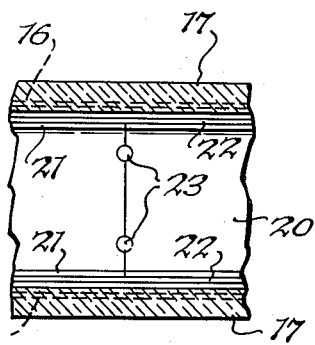
Figure 6:
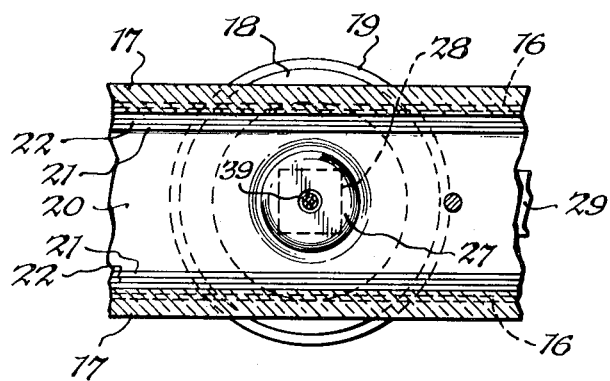

Figs. 5 and 6 are sectional views thereof, on lines 5—5 and 6—6 respectively, Fig. 4.

The signal light or unit includes a body or housing 15 in the form of a flexible split ring or band provided at opposite edges thereof with inwardly extending flanges 16 for engaging the edge portion of a lens or lenses 17 when the split housing is contracted. 18 represents a base, which may, for example, be of inverted cup-shape which may be suitably secured to any desired part of a vehicle, an elastic pad 19 being provided which is interposed between the base 18 and a part 40 of a vehicle. One of the lenses may be replaced by means of an opaque back plate, if it is not necessary for a light to show in opposite directions from the signal light or unit.

Arranged within the housing is a lens support 20 which is in the form of a continuous ring fitting within the housing 15 and having inwardly bent flanges 21 at opposite edges thereof. This ring may be formed of a flat strip of metal bent into circular form and having the ends thereof secured together in any suitable manner, for example, by welding as shown at 23, Fig. 5. The flanges 21 of the lens supporting ring are formed to cooperate with the inner peripheral portions of the lenses and flexible gaskets 22 are positioned between the flanges 21 and the inner peripheral portions of the lenses 17 and the flanges 16 of the housing cooperate with the outwardly facing peripheral portions of the lenses so that the lenses will be supported between the flanges 16 and 21.

The lens supporting member or ring 20 and a portion of the split ring adjacent to the split are rigidly secured to the base 18 in any suitable manner. In the construction illustrated, the base 18 is provided with an upper wall 24 having a centrally arranged annular depression 25 therein, see Fig. 4, and a central hole or perforation. The lens retaining member or ring 22 and a part of the housing 15 are also provided with depressions formed to nest in the depression 25, to facilitate the correct assembly and secure mounting of these parts on the base, and suitable apertures are also provided on these parts which, when alined with the aperture in the base permit a bolt 26 to pass through these alined apertures for rigidly securing these parts to the base. The bolt shown for this purpose is provided with a head 27 which bears against the inner face of the lens supporting member or ring 22 and has the shank thereof provided adjacent to the head with a part 28 of slightly larger dimension than the diameter of the body portion and which is of square or other non-circular cross section. The enlarged portion 28 of the bolt after the same has passed through the alined apertures in the lens supporting ring, the housing and the base is swaged or peined over as clearly shown in Fig. 4, to form a firm connection between these parts.

Figures 1, 2, 3:
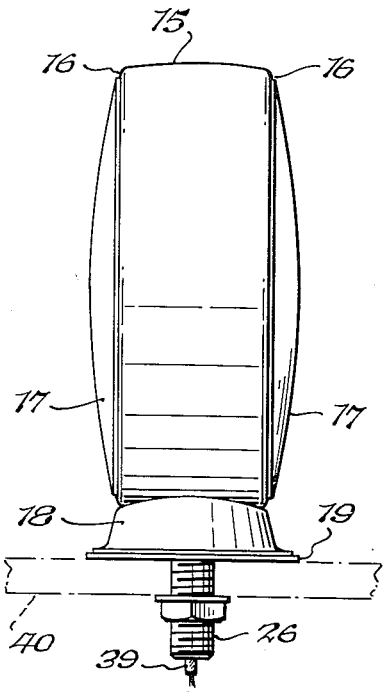
Fig. 1 is a side elevation of a signal light embodying this invention.
Fig. 2 is a front elevation thereof.
Fig. 3 is a transverse sectional plan view thereof, on an enlarged scale, on line 3—3, Fig. 2.

The bolt, of course, is swaged over when the housing and lens supporting member are arranged with the flanges 16 and 21 thereof equally spaced apart to receive the lenses. The shank of the bolt may be secured to any suitable supporting part 40 of an automobile in the usual manner, for example by a nut as shown in Figs. 1 and 2. The bolt is preferably hollow or drilled lengthwise to receive an electrical conductor 39 as hereinafter explained.

As will be noted from the foregoing description, the hollow bolt 26 serves not only the purpose of securing the signal light on a vehicle, but also serves to form a rigid connection between the housing, the lens support and the base. The construction described also forms a secure and rigid connection between the bolt and the signal light. Furthermore, the bolt serves as a conduit for the electrical conductor 39 leading to the light bulb. This construction, consequently, greatly simplifies the construction and facilitates the manufacture of the signal lights.

The split housing may be contracted about the lenses and the ring 20 in any suitable or desired manner to securely hold the lenses in place, and in the construction shown by way of example for this purpose, the end of the housing adjacent to the split which is not secured to the base 18 is provided with a bracket 29 having an outwardly extending lug or part provided with an aperture through which a screw 30 may extend. The base 18 is provided with a threaded hole in which the screw engages. Consequently, by tightening the screw, the housing may be contracted to secure the lenses in place and to firmly connect the other end of the housing with the base.

Preferably a piece of flexible packing material 32 is clamped by means of a bolt 26 between the housing 15 and the lens support or ring 20, one end of this material also extending under the free end of the split housing and the lens-supporting member to form a water-tight connection between the housing and the lens-supporting member.

Within the lens-supporting member a suitable light source, such as an electric light bulb 35, is arranged. This light bulb fits into a socket 36 of any suitable or usual construction and the base of the socket is securely mounted on a rigid supporting bracket or strap 37. The portion of the bracket on which the light socket is mounted extends over the bolt head 27 and is provided with an aperture positioned in alinement with the bore of the hollow bolt 26. The socket member 36 is provided with a similar aperture so that a conductor 39 may extend through the hollow bolt and bracket 37 into the socket for connection with the light bulb. The bracket 37 may be secured to the lens-supporting member 20 in any suitable or desired manner, for example, by riveting or otherwise securing an offset portion 45 to the lens-supporting member 20, as shown in Fig. 4. Other means for mounting the light bulb within the signal light housing may be provided if desired.

The flanges 16 of the housing, as clearly shown in Fig. 4, are bent inwardly to a slight extent into substantially frusto-conical form, extending inwardly at an acute angle to a radial plane of the light, thus flaring laterally or axially to a slight extent away from the interior of the light housing and toward an extension of the axis of the signal light. As a result of this construction, it will be noted that when the housing is contracted, for example, by means of the screw 30, this contraction results not only in a gripping of the lenses, but also the flare of the flanges forces these lenses toward the central radial plane of the light housing, thus compressing the gaskets 22 against the flanges 21 of the lens-supporting member 20. This inward movement of the lenses, consequently, results in a compression of the gaskets 22 in a manner to exclude moisture and other foreign material from the interior of the light housing. This inward flaring exerted by the flaring shoulders or flanges 16 against the lens, the gasket and the flanges of the lens-supporting member 20 also holds these parts against rattling or vibration. The same result, of course, can be accomplished if the peripheral portion of the lens engaged by the inwardly extending flange 16 of the housing flares with reference to a radial plane of the light in the same manner as the flare of the flange 16, which has been described, or, if desired, both the flange and the outer edge portion of the lens engaged thereby may be flared.

By means of the construction described, a strong and durable signal light is produced. The housing, the base and the lens-supporting member are all rigidly secured together and to the supporting bolt 26, so that all of the main structural parts of the signal light remain firmly secured together when the clamping screw 30 is released and the housing expanded. This eliminates the hazard of losing one or more structural parts of the signal light when the same is opened and also makes it impossible to incorrectly assemble the same after replacing a light bulb or a lens. When the housing is contracted by means of the screw 30, the lens or lenses will be rigidly clamped in place. In order to remove and replace the light bulb or lens, it is merely necessary to remove the screw 30 and to separate the parts of the housing at the split to the desired extent to permit removal of the lens or lenses so that access may be had to the interior of the housing. The construction is, therefore, compact and requires no expert service.

It will be understood that various changes in the details, materials, and arrangements of parts which have been herein described and illustrated in order to explain the nature of the invention, may be made by those skilled in the art within the principle and scope of the invention, as expressed in the appended claims.

I claim:

1. A signal light including an annular split flexible housing, a lens, an annular lens-supporting member arranged concentrically within said housing, a base having an upper wall, said housing, said lens-supporting member and said base having alined apertures therein, a hollow bolt extending through said apertures for securing the apertured parts into fixed relation to each other, said housing and lens-supporting member having inwardly extending flanges between which said lens is supported, a light bulb mounted within said lens-supporting member, a conductor extending through said housing and lens-supporting member and connected with said light bulb, and clamping means for drawing the ends of said housing at said split toward each other to grip said lens.

2. A signal light including a lens, an annular split flexible housing having an aperture extending through an end portion thereof adjacent to said split, an annular lens-supporting member arranged within said housing concentric therewith and also provided with an aperture, a base having an upper wall with an aperture therein, a hollow bolt extending through said aperture of said housing, said lens-supporting member and said base and securing said apertured parts together, said housing and said lens-supporting member having inwardly extending flanges between which said lens is supported, a light bulb supported within said signal light, a current-carrying conductor passing through said hollow bolt to said light bulb, and clamping means engaging the other end portion of said housing and said base for contracting said housing about said lens to hold the same between said flanges.

3. A signal light including a lens, an annular split flexible housing having an aperture extending through an end portion thereof adjacent to said split, a lens-supporting member arranged within said housing and also provided with an aperture, a base having an upper wall with an aperture therein, said apertures of said housing, said lens supporting member and said base being alined, a hollow bolt extending through said alined apertures, and having a head engaging the inner surface of said lens-supporting member, said bolt having a portion thereof peined against the lower surface of the upper wall of said base for mounting said housing, said lens-supporting member and said base in fixed relation to each other, said bolt having a threaded portion extending below said housing, a light bulb within said housing, a socket to which said light bulb is removably secured and having an aperture in alinement with said hollow bolt, and a conductor extending through said hollow bolt and said aperture in said socket and electrically connected with said light bulb, and clamping means for drawing the ends of said housing at said split toward each other to grip said lens.

4. A signal light according to claim 3 and including a rigid supporting bracket secured to said lens-supporting member and to which said socket is secured, said socket and said bracket having alined apertures arranged substantially in alinement with said hollow bolt and through which said conductor passes for contact with said light bulb.

5. A signal light including an annular split flexible housing, a lens, a lens-supporting member arranged within said housing in position to engage a part of the inner surface of said lens, a base having an upper wall, said housing, said lens-supporting member and said base having alined apertures therein, a hollow bolt extending through said apertures for securing the apertured parts into fixed relation to each other, said housing and lens-supporting members having inwardly extending flanges between which said lens is supported, a light bulb mounted within said lens-supporting member, a conductor extending through said housing and lens-supporting member and connected with said light bulb, clamping means for drawing the ends of said housing at said split toward each other to grip said lens, said inwardly extending flange of said housing flaring outwardly from said housing, a flexible annular gasket interposed between said flange of said lens-supporting member and said lens, whereby said clamping means, when drawing the ends of said housing toward each other, exerts pressure in a direction axially of said housing for compressing said gasket between said lens and the flange of said lens-supporting member.

6. A signal light including an annular split flexible housing, a lens, an annular lens-supporting member arranged concentrically within said housing, a base having an upper wall, a bolt for attaching said signal light to a part of a vehicle, said base, said housing and said lens supporting member having alined apertures through which said bolt extends, said bolt having a head engaging said lens-supporting member and a part peined against the lower face of said wall of said base and securing said housing, said lens-supporting member and said base in fixed relation to each other, said base having a threaded part extending below said base for attachment to a part of a vehicle, a clamping member connecting said split ends of said housing for contracting said housing about said lens, a light bulb in said housing, said bolt being hollow, and an electrical conductor extending through said hollow bolt and connected with said light bulb.

7. A signal light for mounting on a vehicle and including a lens, an annular split flexible housing which grips said lens when the housing is contracted, a base for supporting said housing on a part of a vehicle, a hollow externally threaded bolt for securing said light to a vehicle part and having one end thereof connected with said housing, said housing having an aperture in alinement with said bolt and said base having an aperture through which said bolt extends, a rigid strap arranged within said housing and having an aperture in alinement with said bolt, a light socket secured to said strap, and a conductor extending through said hollow bolt and said aperture in said strap and said housing and connected with said socket.

References Cited in the file of this patent

UNITED STATES PATENTS

| | | |
|---|---|---|
| 1,322,044 | Otte | Nov. 18, 1919 |
| 1,401,988 | Knapp | Jan. 3, 1922 |
| 1,583,677 | Edelmann | May 4, 1926 |
| 2,614,207 | Smith | Oct. 14, 1952 |

FOREIGN PATENTS

| | | |
|---|---|---|
| 571,756 | Great Britain | Sept. 7, 1945 |